May 14, 1929. E. A. REGAN Re. 17,292

HINGE STRUCTURE

Original Filed Nov. 18, 1926

INVENTOR

Eugene A. Regan

By Archworth Martin,

Attorney.

Reissued May 14, 1929. Re. 17,292

UNITED STATES PATENT OFFICE.

EUGENE A. REGAN, OF OAKLAND, CALIFORNIA.

HINGE STRUCTURE.

Original No. 1,660,657, dated February 28, 1928, Serial No. 149,016, filed November 18, 1926. Application for reissue filed May 24, 1928. Serial No. 280,305.

This invention relates to hinges, such as are employed for doors, cabinets, etc., and especially to that type of hinge which is known as a butt hinge.

The object of the invention is to generally improve and simplify the construction and operation of hinges of the character described; to provide a hinge having a self-containing gauge by means of which it may be readily positioned and aligned without the use of squares or like tools; to provide a hinge in which the leaves are offset with relation to each other both longitudinally and laterally and in which a long pintle bearing may be obtained and further to provide a hinge in which the leaves will lie in a common plane when the hinge is closed.

The hinge is shown by way of illustration in the accompanying drawings, in which.

Figure 2:
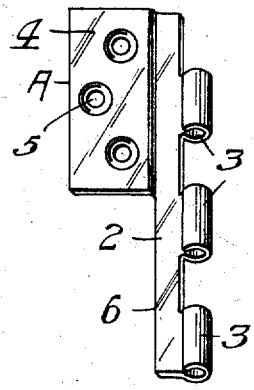
Figure 2 is a perspective view of one leaf of the hinge.

Referring to the drawings, in detail, and particularly to Figure 2, A indicates in general, one of the leaves of the hinge. The leaf consists of a bearing plate 2 on the inner edge of which are formed pintle bearings 3.

Formed integral with the outer edge of the bearing plate is a fastening plate 4, in which is formed a number of holes such as indicated at 5, through which screws or like fastening means may be inserted. The bearing plate 2 on which the pintle bearings are formed is elongated and rectangular in shape and in this instance is twice as long as the fastening plate 4, that is, the fastening plate extends from the upper end of the bearing plate to a point midway thereof, thus leaving half of the outer edge of the bearing plate free and unobstructed, as indicated at 6.

Figure 1:
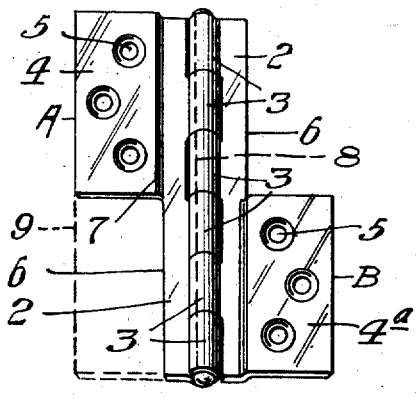
Figure 1 is a perspective view of the hinge.

Formed between the bearing plate and the fastening plate is an offset shoulder 7. This shoulder is formed in alignment with the outer edge 6 of the bearing plate and cooperates therewith to form an aligning gauge to assure perfect alignment of the bearings 3 with the door or jamb to which the hinge is to be secured. The two leaves forming the hinge are indicated at A and B in Figure 1. They are identical in construction and in fact are formed by the same set of dies, that is, the leaves forming the hinge are preferably made of sheet metal and as both leaves are identical in construction, one set of dies will suffice. The two leaves are assembled as shown in Figure 1 and are connected by the usual form of pintle pin such as indicated at 8. The leaves are thus free to swing with relation to each other in the usual manner of butt hinges and may be applied to the ordinary doors and as such may be applied to the doors or rooms or the smaller doors of cabinets and the like and in fact in places where a butt hinge may be employed.

Figure 5:
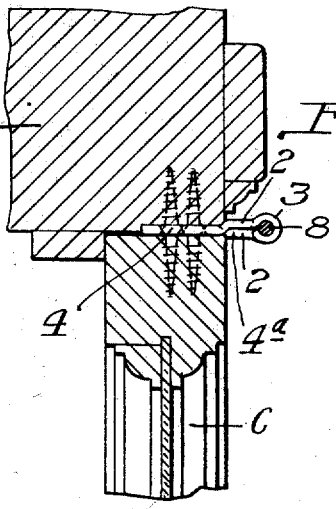
Figure 5 is a sectional view of the hinge showing it applied to a door and jamb and showing the hinge in closed position.

By referring to Figure 1, it will be noted that when two leaves are assembled, that it is accomplished by reversing them end for end. The fastening plate 4 of one leaf will thus assume an upper position and the fastening leaf $4^a$ of the opposite leaf a lower position and as each fastening plate merely extends halfway of the bearing plates, they will align end for end when the hinge is closed, that is, if the leaf A (see Figure 1) is folded over against the leaf B, it will assume the dotted line position indicated at 9, and as both of the fastening plates are offset by the forming of the shoulders 7, they will lie in a common plane, that is, the bearing plates 2 will lie on top of each other when the hinge is closed, as shown in Figure 5, but the fastening plates 4 and $4^a$ will align end for end and will furthermore, assume a position in a common plane.

Figure 3:
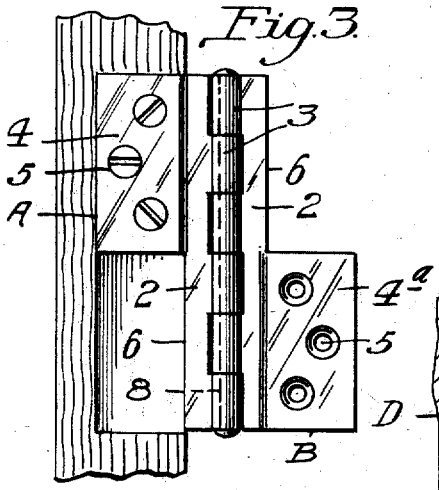
Figure 3 shows the manner in which the hinge is applied and aligned with relation to a door or jamb.
Figure 4:
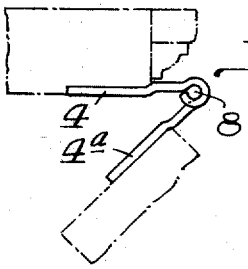
Figure 4 is an end view of the hinge partially open.

A hinge designed and constructed as here described has a number of advantages when comparison is made with ordinary butt hinges. First perfect alignment is obtained between the hinge plate and the jamb by merely applying it to the jamb as shown in Figure 3 and then inserting the fastening screws through the holes indicated at 5 (see Figure 3) and then securing the opposite leaf to the door in the same manner. In other words, a perfect alignment is obtained between the door and jamb when the hinge is applied without the use of squares or like tools. Second: As the hinge leaf sections are made of sheet metal, it becomes unnecessary to gouge out the wood to receive the fastening plates as the hinges lie in a common plane when closed, as shown in Figure 5. In other words, the only space that will be formed between the door C and the jamb D will be that space occupied by the thickness of a single plate. The plates may, of course, be countersunk into the wood of the door or jamb if a flush close-fitting joint is desired, but it is usually unnecessary, particularly when fitting kitchen cabinet doors, locker doors and the like. Third: By constructing the hinge leaf sections as shown a single set of dies will suffice, as both leaves are identical in construction. Fourth: The length of the bearings which support the pintle pin 8 is doubled when comparison is made with ordinary butt hinges and the life of the hinge, due to general wear, should at least be double. Fifth: As the outer edge 6 of the bearing sections and the shoulder 7 engage the outer edge of the door and jamb tipping of the fastening plates with relation to the door jamb is eliminated, as a great part of the weight is taken up by the shoulders and the free edges 6 bearing against the exterior wood of the door and jamb, thus relieving the fastening screws of practically all strain.

Figure 6:
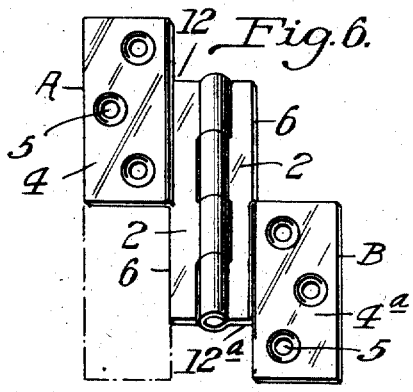
Figure 6 shows another form of the hinge in which the pintle pin and bearings are shortened.

If it is desired to shorten the length of the pintle pin the upper and lower ends of the bearing plates may be cut away as indicated at 12 and 12[a] in Figure 6. Even when the leaf sections are so cut away a greater length of pintle bearing is obtained when comparison is made with ordinary hinges and a saving of material and reduction in weight is obtained when comparison is made with the structure shown in Figure 1.

While the hinges here shown are more or less specifically described and illustrated, I wish it understood that various changes may be resorted to within the scope of the appended claims. Similarly that the materials and finishes of the several parts employed may be such as the manufacturer may decide or varying conditions or uses may demand.

I claim as my invention:

1. A hinge of the class described comprising a pintle, two similar leaves, each consisting of a relatively narrow bearing plate of substantially the length of the bearing portion of the pintle provided at its inner edge with pintle bearings to receive the pintle, and an attaching plate extending from the outer edge of each bearing plate and offset from the plane of the bearing plate to form an offset shoulder spaced from the pintle bearings to provide an alining gauge and to cause the attaching plates to occupy a position in the same longitudinal plane when the hinge is folded.

2. A hinge of the class described, comprising a pintle and two similar leaves, each consisting of a bearing plate extending substantially the length of the pintle and provided at the inner edge with pintle bearings to receive the pintle, and an attaching plate connected with each bearing plate at the outer edge of the bearing plate, the attaching plates extending longitudinally of the hinge in opposite directions from a common point on the pintle to permit them to clear each other in the folding of the hinge, and the said attaching plates being laterally offset from the plane of the bearing plates substantially one-half the thickness of the metal of the plates, whereby the attaching plates are adapted to fold to a position in a common plane when the hinge is closed, with the outer edges of the bearing plates lying adjacent the inner edges of the respective attaching plates.

3. A hinge of the class described comprising a pintle, two leaves, each consisting of an attaching plate and a relatively narrow bearing plate, each bearing plate being provided at its inner edge with pintle bearings to receive the pintle, the attaching plates projecting from the outer edges of the bearing plates, the latter spacing the attaching plates from the pintle, said attaching plates extending longitudinally of the hinge in opposite directions from substantially a common point on the pintle to permit the attaching plates to clear each other on the folding of the hinge, said bearing plates extending longitudinally of the hinge in opposite directions beyond the inner ends of the attaching plates, the portion of the bearing plate extending along one side of the pintle beyond the inner end of the respective attaching plate being engageable with the spacing portion of the bearing plate between the pintle and the respective attaching plate on the other side of the pintle to limit the inward swing of the leaves and aline the attaching plates when the hinge is closed.

4. A hinge of the class described comprising a pintle, two leaves, each consisting of an attaching plate and a bearing plate, each bearing plate being of substantially the length of the bearing portion of the pintle and provided at its inner edge with pintle bearings to receive the pintle, the attaching plates projecting from the outer edges of the bearing plates, the latter spacing the attaching plates from the pintle, said attaching plates extending longitudinally of the hinge in opposite directions from substantially a common point on the pintle to permit the attaching plates to clear each other on the folding of the hinge, the bearing plates extending longitudinally of the hinge in opposite directions beyond the inner ends of the attaching plates, the portion of the bearing plate extending along one side of the pintle beyond the inner end of the respective attaching plate being engageable with the portion of the bearing plate on the other side of the pintle between the pintle and the respective attaching plate to limit the inward swing of the leaves and aline the attaching plates when the hinge is closed.

5. A hinge of the class described comprising a pintle, and two leaves consisting of attaching plates located at different portions of the pintle and narrow bearing plates connecting the attaching plates with the pintle and laterally offset to permit the attaching plates to swing into alinement and arranged to abut to limit the swing of the leaves.

6. A hinge containing a pair of leaf sections, each section consisting of a bearing plate and a connected attaching plate, a plurality of pintle bearings formed on the inner edge of each bearing plate, and a pintle extending through the pintle bearings, one of the attaching plates being offset from the plane of its bearing plate and offset axially of the pintle with respect to the other attaching plate, to permit the attaching plates to be moved into end-to-end relation when the hinge is closed.

In testimony whereof, I have hereunto set my hand this 14th day of May, 1928.

EUGENE A. REGAN.